A. HESSELS.
EAR AND OTHER STUDS.

No. 183,164. Patented Oct. 10, 1876.

UNITED STATES PATENT OFFICE.

ANTHONY HESSELS, OF NEW YORK, N. Y.

IMPROVEMENT IN EAR AND OTHER STUDS.

Specification forming part of Letters Patent No. 183,164, dated October 10, 1876; application filed September 9, 1876.

*To all whom it may concern:*

Figure 1:
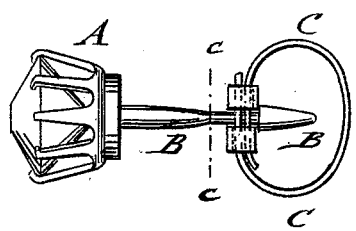
Figure 2:
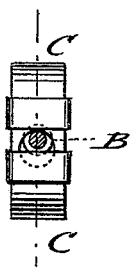
Figure 3:
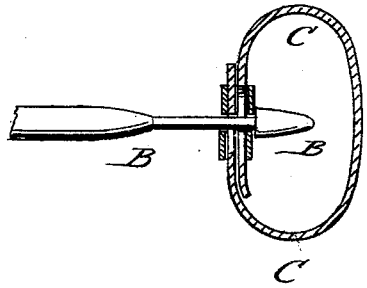

Be it known that I, ANTHONY HESSELS, of the city, county, and State of New York, have invented a new and Improved Ear or other Stud, of which the following is a specification:

In the accompanying drawing, Figure 1 represents a side view; Fig. 2, a vertical transverse section on line *c c*, Fig. 1, of my improved ear-stud; and Fig. 3 is a sectional side view in enlarged scale, showing the stud-retaining spring-ring.

Similar letters of reference indicate corresponding parts.

The principal object of my invention is to furnish an improved construction of ear-studs for ladies' use, by which the studs may be attached to and detached from the ear with great facility, they being securely retained thereon without showing any fastening parts.

It has become fashionable of late to wear the diamond and other studs or drops in the ears without rings or other suspending parts that may be readily seen. The studs have, therefore, been made with screws or other devices, so as to avoid the rings; but all these devices are either troublesome in being put on or taken off, and sometimes even painful, so as to give dissatisfaction to the wearers.

My invention is designed to facilitate the use of such ear-studs that are secured directly to the ear; and it consists of a recessed shank of the stud, that is passed through the ear-hole and locked to the ear by a fastening spring-ring applied to the shank at the hind side of the ear.

In the drawing, A represents an ear-stud of any suitable style and finish, and B the shank of the same, which is annularly recessed or made thinner at its middle part, so as to form a shoulder or collar near the outer pointed end of the shank, as shown in Figs. 1 and 2. A spring-ring, C, with perforated or slotted and suitably-guided ends, is placed over the end of the shank by compressing the ends, so that the holes or slots register and admit the ready insertion of the shank end. The spring-ring is released when the shank has entered far enough that the thinner part is in the holes, causing thereby the slotted ends to close on the shoulder or collar and prevent the shank from being withdrawn from the ring.

For detaching the stud from the spring-ring the ring is again pressed together by the fingers until the holes at the ends register, which admits the withdrawing of the shank with great facility. The ear-stud is thus applied to and taken off from the ear without any trouble or pain, the shank passing easily through the hole pierced through the ear, after which the spring-ring is applied in an instant and detached in similar manner.

The fastening device is fully covered by the ear, as it is made small, and, therefore, not discernible from the front.

The same construction may also be applied with great facility for shirt-studs, preventing the losing and other disadvantages incidental to the present screw and other studs.

Having thus described my invention, I claim as new and desire to secure by Letters Patent—

1. As an improvement in ear and other studs, the combination of the annularly-recessed shank of the stud with the perforated or slotted ends of a spring-ring applied thereto back of the ear or shirt-front, substantially in the manner described, and for the purpose specified.

2. A spring-ring for ear and other studs, provided with slotted or perforated and guided ends, substantially as described and shown.

ANTHONY HESSELS.

Witnesses:
PAUL GOEPEL,
C. SEDGWICK.